(12) United States Patent
Cornelissen et al.

(10) Patent No.: US 6,184,949 B1
(45) Date of Patent: Feb. 6, 2001

(54) REFLECTIVE FLAT-PANEL COLOR DISPLAY DEVICE HAVING A DIFFUSING LAYER AND COLOR FILTER ON THE SAME SIDE OF A DIFFUSING LIQUID CRYSTAL LAYER

(75) Inventors: Hugo J. Cornelissen; Jacobus H. M. Neijzen; Fransiscus A. M. A. Paulissen, all of Eindhoven (NL)

(73) Assignee: U.S. Philips Corp., New York, NY (US)

( * ) Notice: Under 35 U.S.C. 154(b), the term of this patent shall be extended for 0 days.

(21) Appl. No.: 08/993,132

(22) Filed: Dec. 18, 1997

(30) Foreign Application Priority Data

Dec. 20, 1996 (EP) .................................. 96203647

(51) Int. Cl.⁷ ................................. G02F 1/1335
(52) U.S. Cl. .............................. 349/64; 349/106; 349/113
(58) Field of Search .................... 349/105, 106, 349/113, 104, 64, 112

(56) References Cited

U.S. PATENT DOCUMENTS

| 5,194,976 | * | 3/1993 | Nakano et al. ................ 359/79 |
| 5,486,884 | * | 1/1996 | De Vaan ...................... 353/122 |
| 5,508,831 | * | 4/1996 | Nakamura et al. .............. 359/51 |
| 5,537,232 | * | 7/1996 | Biles ......................... 359/15 |
| 5,659,408 | * | 8/1997 | Wenyon ....................... 349/112 |
| 5,684,552 | * | 11/1997 | Miyamoto et al. .............. 349/106 |
| 5,691,788 | * | 11/1997 | Kim ........................... 349/96 |
| 5,721,603 | * | 2/1998 | De Vaan et al. ............... 349/194 |
| 5,734,457 | * | 3/1998 | Mitsui et al. ................ 349/106 |
| 5,818,554 | * | 10/1998 | Hiyama et al. ................ 349/67 |
| 5,889,570 | * | 3/1999 | Mitsui et al. ................ 349/113 |
| 5,899,551 | * | 5/1999 | Neijzen et al. ............... 349/115 |

FOREIGN PATENT DOCUMENTS 59-10924   1/1984  (JP) ................................ G02F/1/05

OTHER PUBLICATIONS

"Optimization of Property of Reflector for Reflective Color LCDs" by Norio Sugiura et al, proceedings of Active Matrix LCD 1995, pp. 153–156.

* cited by examiner

Primary Examiner—Walter Malinowski

(57) ABSTRACT

The invention relates to a reflective flat-panel color display device (1) having a diffusing display panel (3). The display panel (3) comprises a diffusing liquid crystalline material (5) present between a first and a second substrate (7, 9). A color filter pattern (15) which corresponds to the pixel pattern of the display panel (3) is present between the liquid crystalline material (5) and the second substrate (9). A diffusing reflector is present at the side of the color filter pattern (15) remote from the liquid crystalline material (5). In another embodiment, a reflector (17), which has a diffusing or non-diffusing effect, is present outside the display panel (3) and a forward diffuser (33) is arranged between this reflector (17) and the display panel (3).

13 Claims, 3 Drawing Sheets

REFLECTIVE FLAT-PANEL COLOR DISPLAY DEVICE HAVING A DIFFUSING LAYER AND COLOR FILTER ON THE SAME SIDE OF A DIFFUSING LIQUID CRYSTAL LAYER

BACKGROUND OF THE INVENTION

The invention relates to a reflective flat-panel color display device having a display panel which comprises a diffusing liquid crystalline material present between a first and a second substrate, the display device including a color filter.

A display panel as used in the color display device of the type described in the opening paragraph is known from, for example the English-language abstract of JP-A 59-10924. This document describes a flat-panel reflective display device in which a dichroic reflector is arranged under the optically active layer. A diffusing and reflecting plate is arranged outside the display panel. The dichroic reflector is transmissive to green light and reflective to red and blue light. When a white beam is incident on the display device and when the liquid crystalline material is in its diffuse state, then red and blue are diffused in the layer and subsequently reflected by the dichroic reflector. They return as diffuse light. Green light is also diffused in the layer and passed by the dichroic reflector to the next reflector. Reflection and diffusion take place on this reflector so that also the green beam returns as a diffuse beam. For the viewer, the display device is in the bright state. When a white beam is incident on the display device and when the layer is in the transparent state, then red and blue light will be reflected on the dichroic mirror without being diffused. The green light is passed and reflected on the diffusing reflector. The green light thus returns in a diffuse state. The viewer now watches a green monochrome display panel.

A drawback of the display device known from the abstract is that an artefact occurs when this configuration is used for a three-color panel. Namely, a transparent pixel will produce a light spot on the diffusing reflector. The edges of this light spot will be visible to the viewer through neighbouring transparent pixels, so that the viewer will observe ghost images. A further drawback is that the diffuser mentioned in this document diffuses through 180°. This light will be enclosed in the substrate until it reaches a pixel with a color filter passing the relevant color to the liquid crystalline layer. However, in this way, a part of this light will not be coupled out when it reaches the sides of the display panel so that this part will be lost. When, for example a pixel is blue in the transparent state, it will be light yellow instead of white in a diffuse state, due to loss at the sides.

SUMMARY OF THE INVENTION

It is an object of the invention to provide a reflective flat-panel display device having a relatively satisfactory white balance and a relatively high brightness, in which the occurrence of disturbing light spots in the viewing angle of the viewer is obviated.

To this end, the reflective flat-panel display has a color filter with a pattern which corresponds to the pixel pattern of the display panel, and a backward-diffusing layer is present between the color filter pattern and the second substrate.

By arranging the diffuser in the display panel, the light will not reach the substrate and ghost images are prevented.

The invention is further based on the recognition that hardly any light is absorbed in the display device but that unsuitable light is redirected and redistributed. Per pixel, at least one-third of the incident light is converted into diffuse light instead of being absorbed.

An alternative embodiment which is based on the same recognition is characterized in that the color filter comprises a pattern which corresponds to the pixel pattern of the display panel, and a forward diffuser is arranged between the reflector and the display panel.

By providing an extra forward diffuser, if the backward diffuser is arranged outside the display panel, the beam passed by a transparent pixel is first forwardly diffused before it reaches the backward diffuser and the light spot is spread so that its edges are no longer visible within the viewer's viewing angle.

A preferred embodiment of the reflective flat-panel display device according to the invention is characterized in that the backward diffuser diffuses within a given angular range $\Delta\Theta$. This has the advantage that, notably for the embodiment with the external backward diffuser, the light enclosed in the substrate stands a reasonable chance of being coupled out via a pixel before it reaches the side of the display panel and thus cannot contribute to the brightness of the display device.

A further embodiment of the reflective flat-panel display device according to the invention is characterized in that each color filter associated with the color filter pattern is transmissive to at least one primary color and specularly reflective to the other primary colors.

In the transparent state of the liquid crystalline layer, incident light is passed unhindered to the color filter pattern. The color to which the relevant filter element is transmissive will be diffused on the backward diffuser and return as a diffuse beam. The colors to which the filter element is specularly reflective will be reflected away and will not reach the viewer's viewing angle. The viewer will perceive the relevant pixel in a color for which the filter element corresponding to the pixel is transmissive.

In the diffuse state of the liquid crystalline layer, all colors will first be diffused in this layer. One or two colors will be reflected on the filter element, while the other color or colors still pass via the backward diffuser. Since all colors now return as diffuse beams, the viewer will perceive the relevant pixels in a bright state.

A pixel consequently switches between the "white state" and the color to which the relevant filter element is transmissive.

A further embodiment of the reflective flat-panel display device according to the invention is characterized in that the elements of the color filter pattern comprise a dielectric material.

A dielectric stack can easily be provided as a thin layer in the display panel. Moreover, such a material has a relatively high electric resistance and can consequently be combined easily with an active matrix display panel. Dielectric materials further have the advantage that they reflect rotationally symmetrically.

Another embodiment of the reflective flat-panel display device according to the invention is characterized in that the color filters comprise at least two and an even number of layers of a cholesteric liquid crystalline material, one layer of a pair being levorotatory and the other layer of said pair being dextrorotatory, both layers covering the same wavelength range.

A cholesteric layer is a liquid crystalline layer having a cholesteric ordering. This means that the molecules of the material spontaneously order in solution to a helical or helix-like structure with a pitch p. After providing such a solution as a thin, active layer between two parallel substrates, the helix-like structure is directed in such a way that the axis of the helix will be transverse to the layer.

When an unpolarized beam is incident on a cholesteric polarizer, the levorotatory and dextrorotatory circularly polarized beam components will be separated from each other. Namely, a beam component having the direction of rotation corresponding to the direction of the helix will be reflected, whereas the beam component having the other direction of rotation will be passed. However, the fact whether the beam component is passed or not passed is not only determined by the direction of rotation but also by the wavelength of the incident beam. The reflection wavelength $\lambda_o=\frac{1}{2}(n_o+n_e)p$. Of the beam component having the direction of rotation corresponding to the direction of the pitch, only that part will be reflected which is located within the wavelength band $\lambda_o$. Since the light is not to be polarized in the application described here, there should always be two cholesteric layers per wavelength range, namely a levorotatory and a dextrorotatory layer so that both directions of polarization, in other words, the full beam, is reflected within the relevant wavelength range.

Another embodiment of the reflective flat-panel display device according to the invention is characterized in that the color filters comprise a holographic liquid crystalline diffusing material.

A holographic liquid crystalline material is understood to be a PDLC layer in which a refractive index modulation is produced because the photopolymerization has taken place in a three-dimensional intensity distribution realized by interfering light beams.

An example of such an element is described in the article "Optimization of holographic PDLC for reflective color display applications" by K. Tanaka et al. in SID 95 DIGEST, pp. 267–270.

A PDLC layer is a layer which is formed from a liquid crystalline material dispersed in the form of drops in a transparent polymer material. The pixels of this layer can be switched to a diffuse or a transparent state by means of electrodes.

These and other aspects of the invention are apparent from and will be elucidated with reference to the embodiments described hereinafter.

DETAILED DESCRIPTION OF THE PREFERRED EMBODIMENTS

Figure 1A:
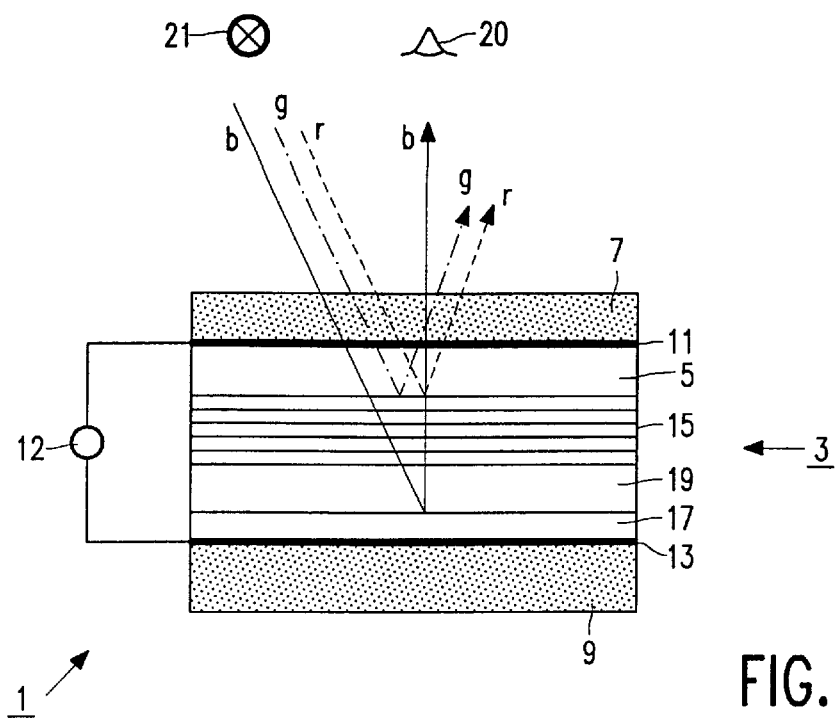
FIGS. 1(a)–1(c) show embodiments of a reflective flat-panel color display device according to the invention, in which the display panel is in a transparent and in a diffuse state, respectively.

The display device 1 shown in FIG. 1(a) has a display panel 3. The display panel comprises a first substrate 7 and a second substrate 9 enclosing a layer 5 of a diffusing liquid crystalline material which functions as an optically active medium. This layer 5 may be, for example, a PDLC layer (polymer dispersed liquid crystal). Other examples of suitable layers are PNLC (polymer network liquid crystal) and PSCT (polymer stabilized cholesteric texture).

A PDLC layer comprises, for example a liquid crystalline material which is dispersed in the form of drops in a transparent polymer material. Each substrate 7, 9 is further provided with an electrode layer 11, 13. The liquid crystalline layer 5 is spread out in pixels which are driven by electrodes by means of a voltage source 12. Within pixels for which no voltage is applied on the electrode layer, as in FIG. 1(b), the molecules within the drops have a given net orientation, but the orientation between the drops themselves is different. These pixels are in a diffuse state. When a voltage is applied to the electrodes (FIG. 1(a)), the molecules will direct themselves with the same orientation within the corresponding pixels. These pixels are in a transparent state. To clearly illustrate the effect, FIGS. 1(a) and 1(b) each show the complete PDLC layer in the same state.

A color filter 15 which corresponds to the pixel pattern of the display panel is provided between the PDLC layer 5 and the substrate 9. This means that a color filter element corresponds to each pixel on the display panel. Such a filter element may be, for example transmissive to one primary color, whereas it reflects the two other colors. Alternatively, it may be transmissive to two colors and reflect only one color. The choice of the color or colors for which transmission should occur is determined by the color to be represented by the separate pixels. The reflection through the filter element should be specular or retroreflective.

The picture display device according to the invention further includes a diffusing reflector 17 between the color filter pattern 15 and the second substrate 9, which reflector backwardly diffuses only within a given angular range. An example of such an element is described in, for example the article "Optimization of property of reflector for reflective color LCD's" by N. Sugiura and T. Uchida in the proceedings of Active Matrix LCD 1995, pp. 153–156.

A layer 19 for leveling the possibly rough surface of the diffuser 17 may be present between the diffuser 17 and the color filter pattern 15. However, this layer is optional.

Figure 1B:
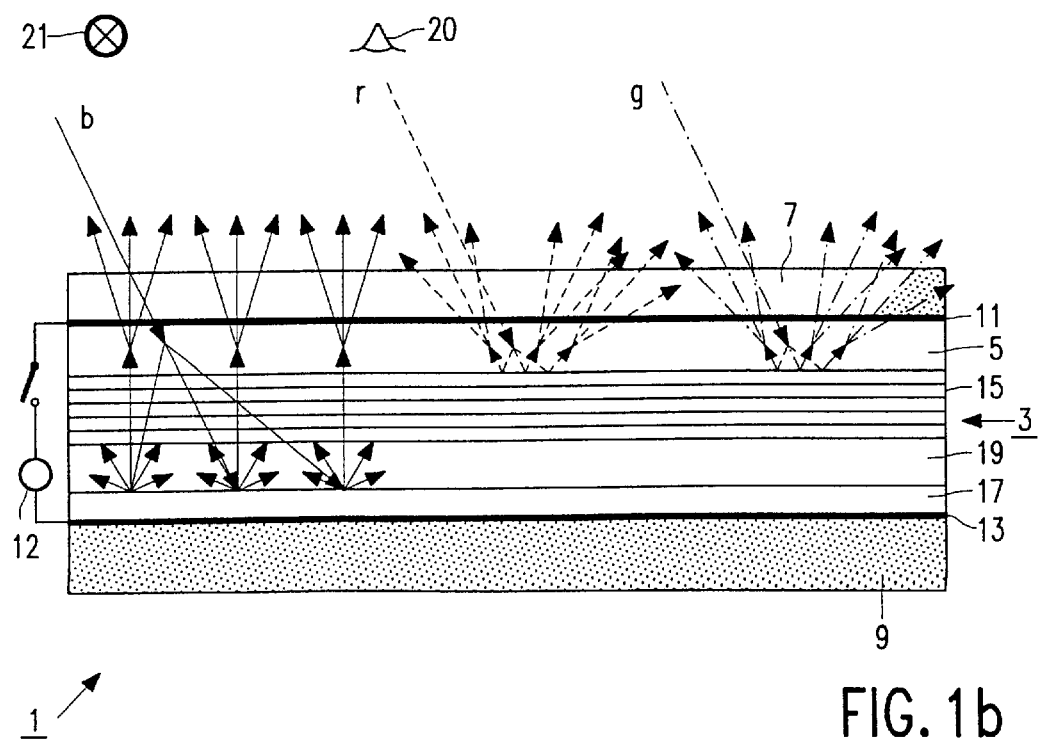

For the purpose of illustration, an example will now be given for a blue pixel. To this end, the FIGS. 1(a) and 1(b) are assumed to represent one pixel. Such a pixel is provided with a blue color filter. This is a filter which passes blue light and specularly reflects green and red light. When the pixel is in a transparent state (FIG. 1(a)), a blue light beam b, likewise as a red light beam r and a green light beam g will be passed unhindered by the PDLC layer 5 and reach the filter 15. The red and green light beams are eliminated from the viewing angle of the viewer 20, whereas the blue light beam is passed by the filter 15 and reaches the diffuser 17. There, the blue light is backward diffused within a given angular range and passed, via the reflector 15 and the transparent PDLC layer 5 towards the viewer 20. The viewer will perceive a diffuse blue pixel. When the display panel is in a diffuse state, the blue light beam will be diffused both by the diffuser and by the liquid crystalline layer. The red and green light beams will be diffused by the liquid crystalline layer and reflected by the filter. In this way, red and green diffuse light is added to the blue diffuse light so that the panel is in a bright, white state perceived by the viewer. The white state is thus caused by diffuse reflection of each of the three colors.

In FIGS. 1(a) and 1(b), the electrodes 11, 13 are present on the substrates 7, 9. The second electrode 13 may also be present on the lower side or on the upper side of the layer 15 of filter elements.

When the liquid crystalline material within a pixel switches between the transparent and the diffuse state, the corresponding pixel will switch between its monochrome color and the white state. The colors which are not used are not absorbed but reflected away from the viewing angle. The filter is thus transparent to the color or colors of the pixel corresponding thereto and specularly reflective to the other colors.

The black state of a pixel can be realized by diffuse reflection of one-third of each color and specular reflection of the rest of the light.

Figure 1C:
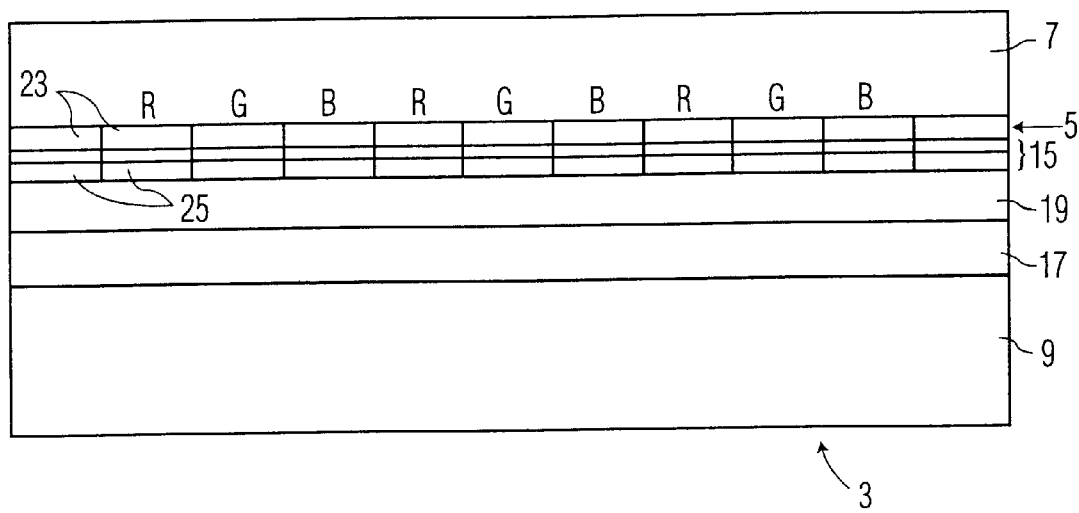

FIG. 1(c) shows the display panel 3 with a plurality of pixels 23 for colors red, green, and blue as determined by which colors are reflected and which colors are passed by the underlying filers 25.

The Table below shows the relation between the state of the liquid crystalline material in a pixel and the color reproduced by this pixel.

| desired pixel color | red pixel | green pixel | blue pixel |
| --- | --- | --- | --- |
| red | diffuse | transparent | transparent |
| green | transparent | diffuse | transparent |
| blue | transparent | transparent | diffuse |
| mixed color | partly diffuse | partly diffuse | partly diffuse |
| black | transparent | transparent | transparent |
| white | diffuse | diffuse | diffuse |

Figure 2:
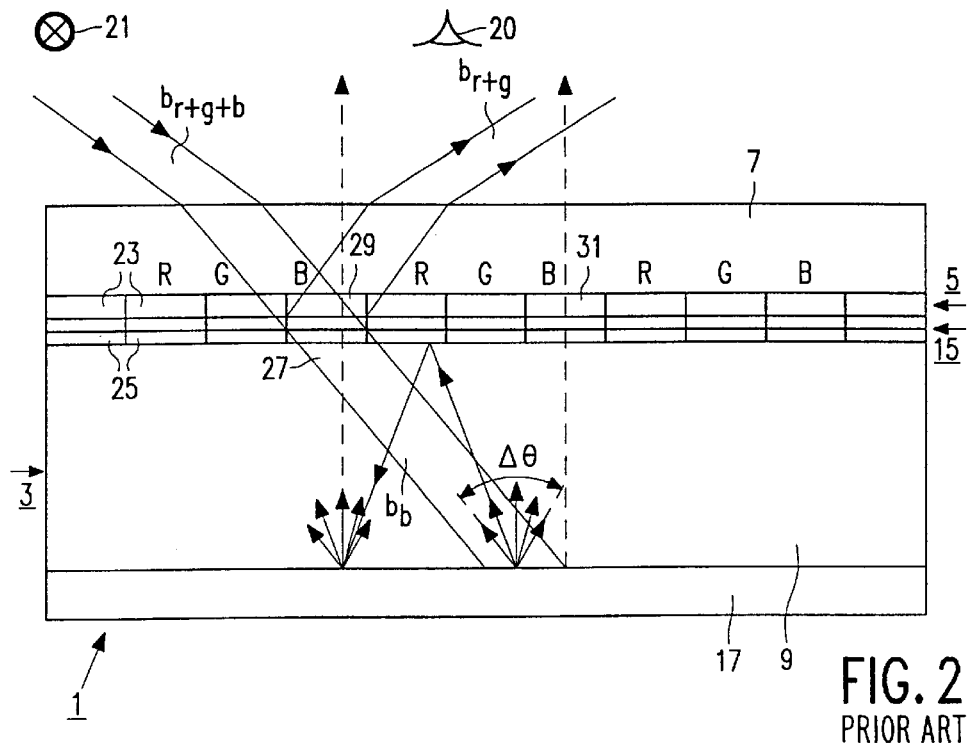
FIG. 2 illustrates how ghost images are produced in a prior art display panel.

FIG. 2 illustrates the artefact which would occur if the backward diffuser 17 were outside the display panel and if no further measures were taken, as in the aforementioned abstract. In FIG. 2, the PDLC layer 5 is divided into pixels 23. A color filter 25 forming part of the reflective layer 15 is present under each pixel 23, 29, 31. When, for example two neighboring blue pixels 29, 31 are in a transparent state, as in FIG. 2, and a white beam $b_{r+g+b}$ is incident thereon, then the beam is first and foremost passed undisturbed by the PDLC layer to an element 25 which is present under the relevant pixel 29. The red and green components $b_{r+g}$ will be specularly reflected by the filter element 25. The blue component $b_b$ passes through the substrate 9 to the diffusing reflector 17 where backward diffusion will occur within a given angular range ΔΘ. The pixel 29 itself will be perceived as a blue pixel, but simultaneously this transparent pixel 29 will cause a light spot on the diffusing reflector 17, a part of which spot will extend as far as the neighboring blue pixel 31. Consequently, the edges of this light spot are visible within the viewing angle of the viewer 20 so that a ghost image will be perceived. This is prevented by the present invention. A first possibility of obviating this drawback has been described hereinbefore.

Figure 3:
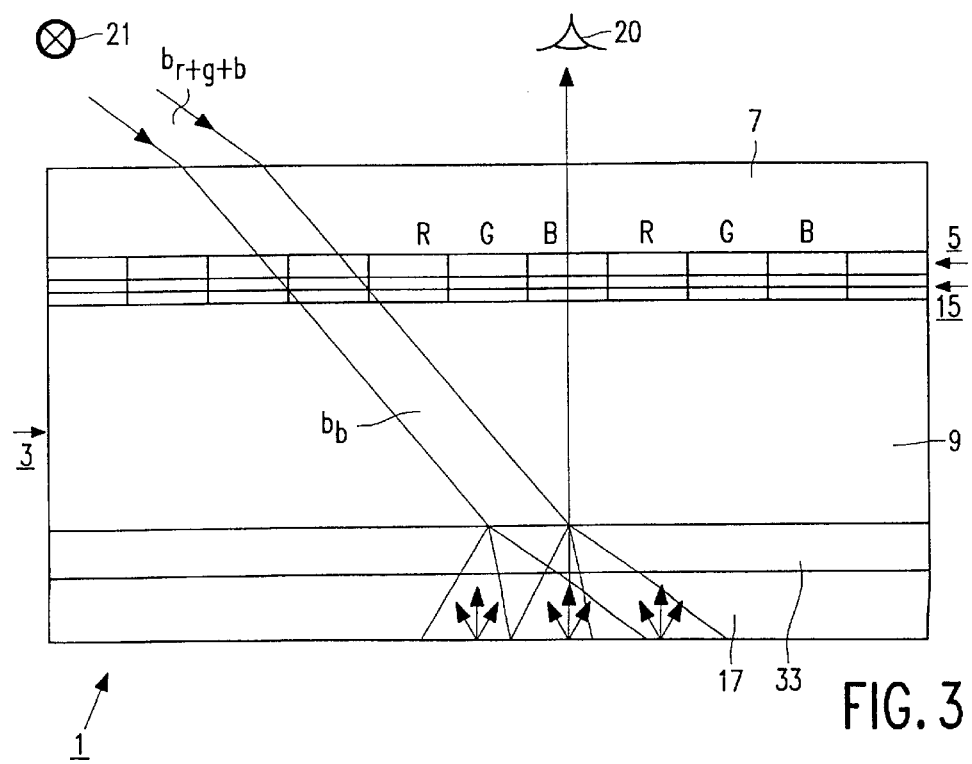
FIG. 3 shows another embodiment of a reflective flat-panel color display device according to the invention.

Another possible embodiment of the picture display device is shown in FIG. 3. Here, the reflector 17 is present outside the display panel but a forward diffusor 33 is arranged between the display panel and the reflector 17. In this case, the reflector 17 may be both a diffusing and a specular reflector, because diffusion already takes place in the layer 33. The beam $b_b$ which has been passed by the transparent pixel 29 thus first reaches the forward diffuser 33 so that the beam which is incident on the reflector 17 is a diffuse beam. In this way, the light spot which normally gives rise to a ghost image via the neighboring pixel 31, is spread out. The edge of this light spot will thus no longer be perceived within the viewing angle of the viewer. Ghost images can be prevented in this way.

In all embodiments of the display device according to the invention, the reflector 17, if a diffusing reflector, preferably diffuses only within a given angular range ΔΘ. In this way, notably in the case where the reflector 17 is outside the display panel, the light enclosed in the substrate 9 is prevented from reaching the sides of the display panel without being coupled out via a pixel in which case it would not contribute to the brightness of the display device.

The illumination may consist of ambient light, one or more directed radiation sources or a combination thereof. For the sake of simplicity, the illumination is indicated by a single radiation source 21.

The color filter 15 pattern may be implemented in different ways. A first possibility is to implement each filter element as a stack of dielectric layers. The composition of the stack determines the wavelength dependence of the reflection.

Another possibility is to use a stack of cholesteric layers. This number of layers is at least two and should always be an even number because a cholesteric layer behaves as a circular polarizer. To exclude the polarizing effect, two layers should be used for each wavelength range, with opposite directions of rotation of the molecular helix.

A third possibility is a holographic liquid crystalline material. A holographic liquid crystalline material is understood to be a PDLC layer in which a refractive index modulation is produced because the photopolymerization has taken place in a three-dimensional intensity distribution realized by interfering light beams. The wavelength band within which such an element has a reflective effect is determined by the angles at which the holographic illumination takes place.

What is claimed is:

1. A reflective flat-panel color display device comprising
   a first substrate,
   a second substrate,
   a diffusing liquid crystalline material divided into a plurality of pixels arranged in a pattern between a first substrate and a second substrate, the display device including a color filter between the liquid crystalline material and the second substrate, the color filter comprising a pattern of color filter elements which corresponds to the pixel pattern, and
   a backward-diffusing layer between the color filter and the second substrate.

2. A reflective flat-panel color display device as claimed in claim 1, wherein the backward diffusing layer diffuses within a given angular range ΔΘ.

3. A reflective flat-panel color display device as claimed in claim 1, wherein each color filter element is transmissive to at least one primary color and specularly reflective to the other primary colors.

4. A reflective flat-panel color display device as claimed in claim 1, wherein the filter elements comprise a dielectric material.

5. A reflective flat-panel color display device as claimed in claim 1, wherein the color filter elements comprise at least two and an even number one pair of layers of a cholesteric liquid crystalline material, one layer of each said pair being levorotatory and the other layer of said pair being dextrorotatory, both layers covering the same wavelength range.

6. A reflective flat-panel color display device as claimed in claim 1, wherein the color filter comprises a holographic liquid crystalline diffusing material.

7. A reflective flat panel display device comprising
   a first substrate,
   a second substrate, a diffusing liquid crystalline layer between said substrates, said layer being divided into a plurality of pixels arranged in a pattern, a color filter between the liquid crystalline layer and the second substrate, said color filter being divided into a plurality of color filter elements arranged in a pattern which corresponds to the pattern of pixels, a reflector adjacent to the second substrate, opposite from the first substrate, and a forward diffusing layer between the reflector and the second substrate.

8. A reflective flat panel color display device as in claim 7 wherein the reflector is a backward diffusing layer.

9. A reflective flat panel color display device as in claim 8 wherein the backward diffusing layer diffuses within a given angular range $\Delta\Theta$.

10. A reflective flat panel color display device as in claim 7 wherein each color filter element is transmissive to at least one primary color and specularly reflective to the other primary colors.

11. A reflective flat panel color display device as in claim 7 wherein the filter elements comprise a dielectric material.

12. A reflective flat panel color display device as in claim 7 wherein the color filter elements comprise at least two and an even number one pair of layers of a cholesteric liquid crystalline material, one layer of each said pair being levorotatory and the other layer of said pair being dextrorotatory, both layers covering the same wavelength range.

13. A reflective flat panel color display device as in claim 7 wherein the color filter comprises a holographic liquid crystalline diffusing material.

* * * * *